United States Patent [19]

Nicolai

[11] Patent Number: 4,982,427
[45] Date of Patent: Jan. 1, 1991

[54] INTEGRATED CIRCUIT FOR TELEPHONE SET WITH SIGNAL ENVELOPE DETECTOR

[75] Inventor: Jean Nicolai, Aix en Provence, France

[73] Assignee: SGS Thomson Microelectronics S.A., Gentilly, France

[21] Appl. No.: 406,155

[22] Filed: Sep. 12, 1989

[30] Foreign Application Priority Data

Sep. 16, 1988 [FR] France .................................. 88 12117

[51] Int. Cl.$^5$ .............................................. H04M 9/08
[52] U.S. Cl. ..................................... 379/406; 379/390; 379/395
[58] Field of Search ............... 379/389, 390, 406, 410, 379/411, 387, 395

[56] References Cited

U.S. PATENT DOCUMENTS

| | | | |
|---|---|---|---|
| 4,513,177 | 4/1985 | Nishino et al. ....................... | 379/389 |
| 4,555,596 | 11/1985 | Blomley .............................. | 379/389 |
| 4,796,287 | 1/1989 | Reesor et al. ....................... | 379/390 |

FOREIGN PATENT DOCUMENTS 0120325 2/1984 European Pat. Off. .
2122851 6/1982 United Kingdom .
2175175 10/1985 United Kingdom .

OTHER PUBLICATIONS

NEC- Research and Development, No. 83, Oct. 1986, T. Makabe et al.
Motorola Technical Developments, vol. 5, No. 1, Oct. 1985, D. E. Bush.
Electronics, vol. 59, No. 33, Oct. 1986, R. Rosenberg.

*Primary Examiner*—Jin F. Ng
*Assistant Examiner*—Jhancy Augustus
*Attorney, Agent, or Firm*—Roland Plottel

[57] ABSTRACT

The disclosure concerns digital telephone sets and, more particularly, those with amplified listening facility and "hands free" telephones. To fulfil the function of the anti-Larsen effect needed in these telephones, there is need for a signal envelope detector which gives a measurement of the mean level of the signal emitted or received on the line. According to the disclosure, the cofidec present in the digital telephones is used to establish an envelope detection system with logarithmic compression. This removes the need to do a logarithmic detection on the analog speech signal. Such a detection would necessitate diodes, upside down with respect to each other, which can be made, particularly, only through bipolar technology. A series/parallel converter, a digital comparator and a counter having a countdown frequency which is far slower than the counting frequency, fulfils the signal envelope detection function.

8 Claims, 4 Drawing Sheets

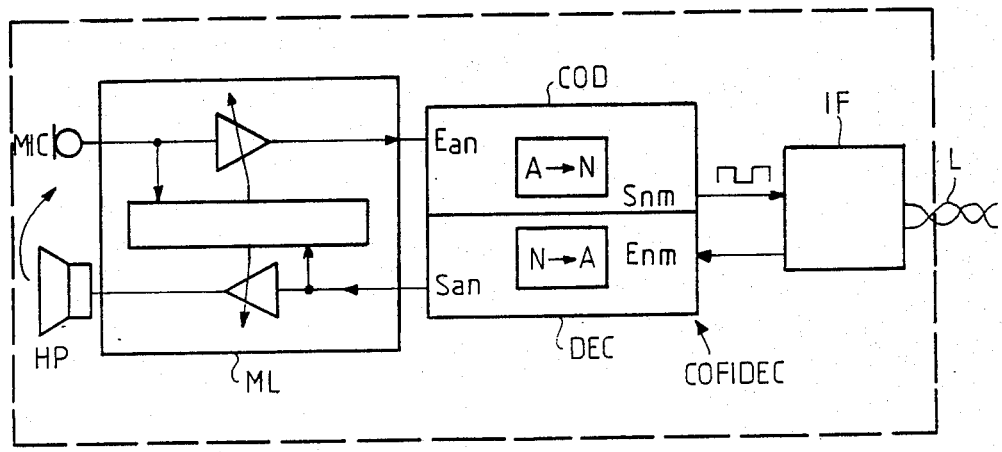
FIG_1
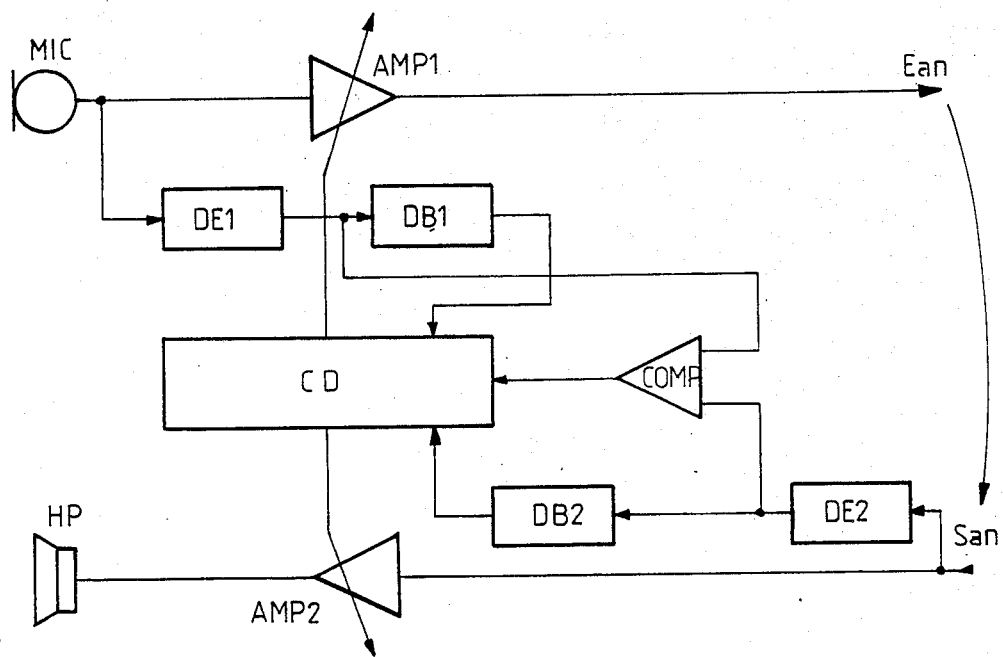
FIG_2

FIG_3
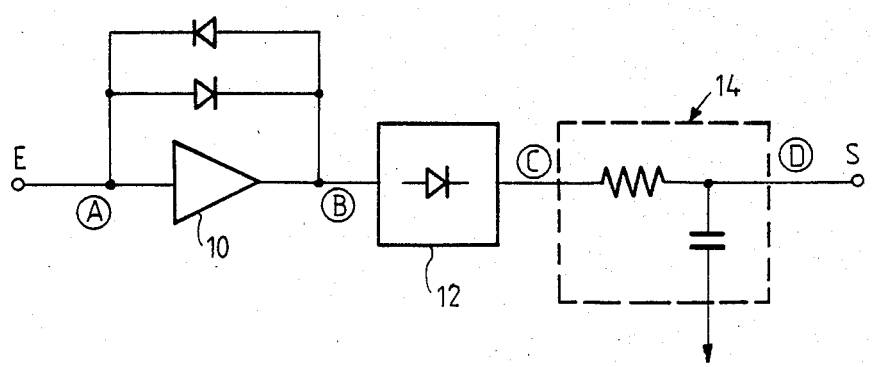
FIG_4
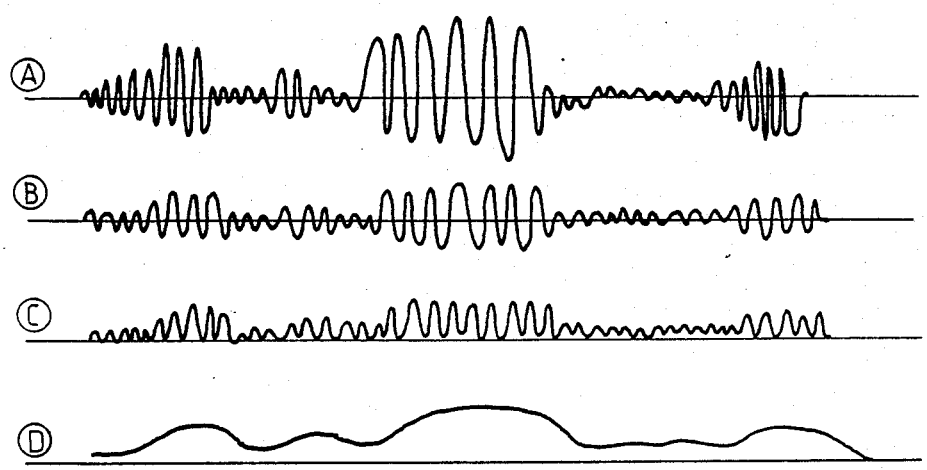

FIG_5
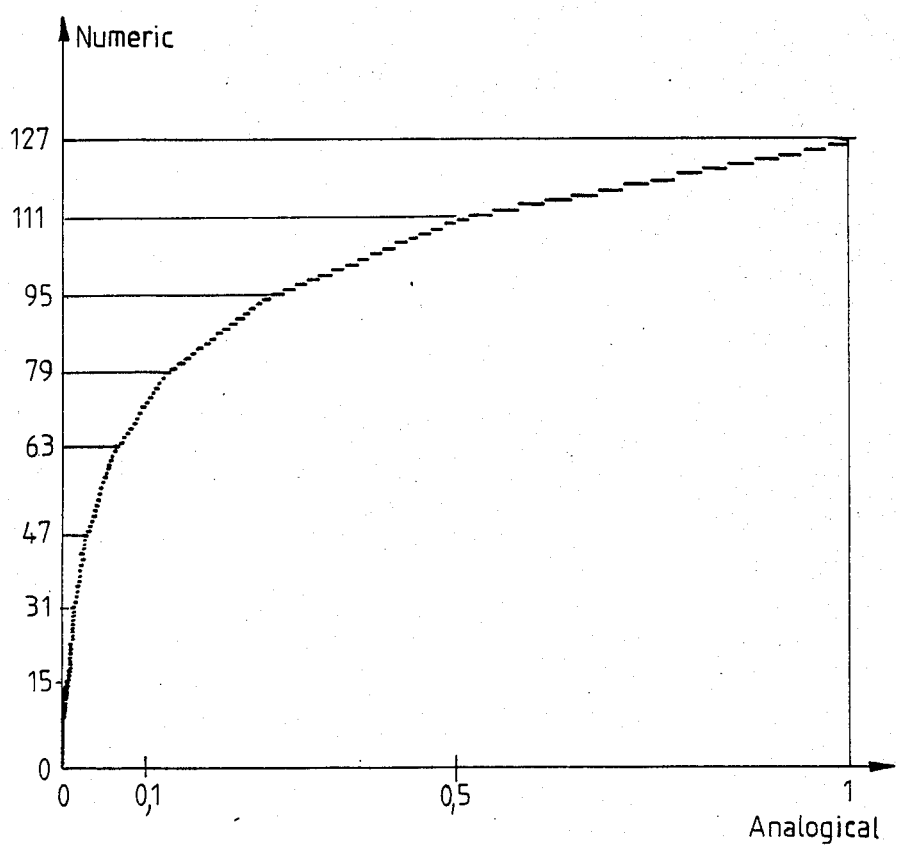

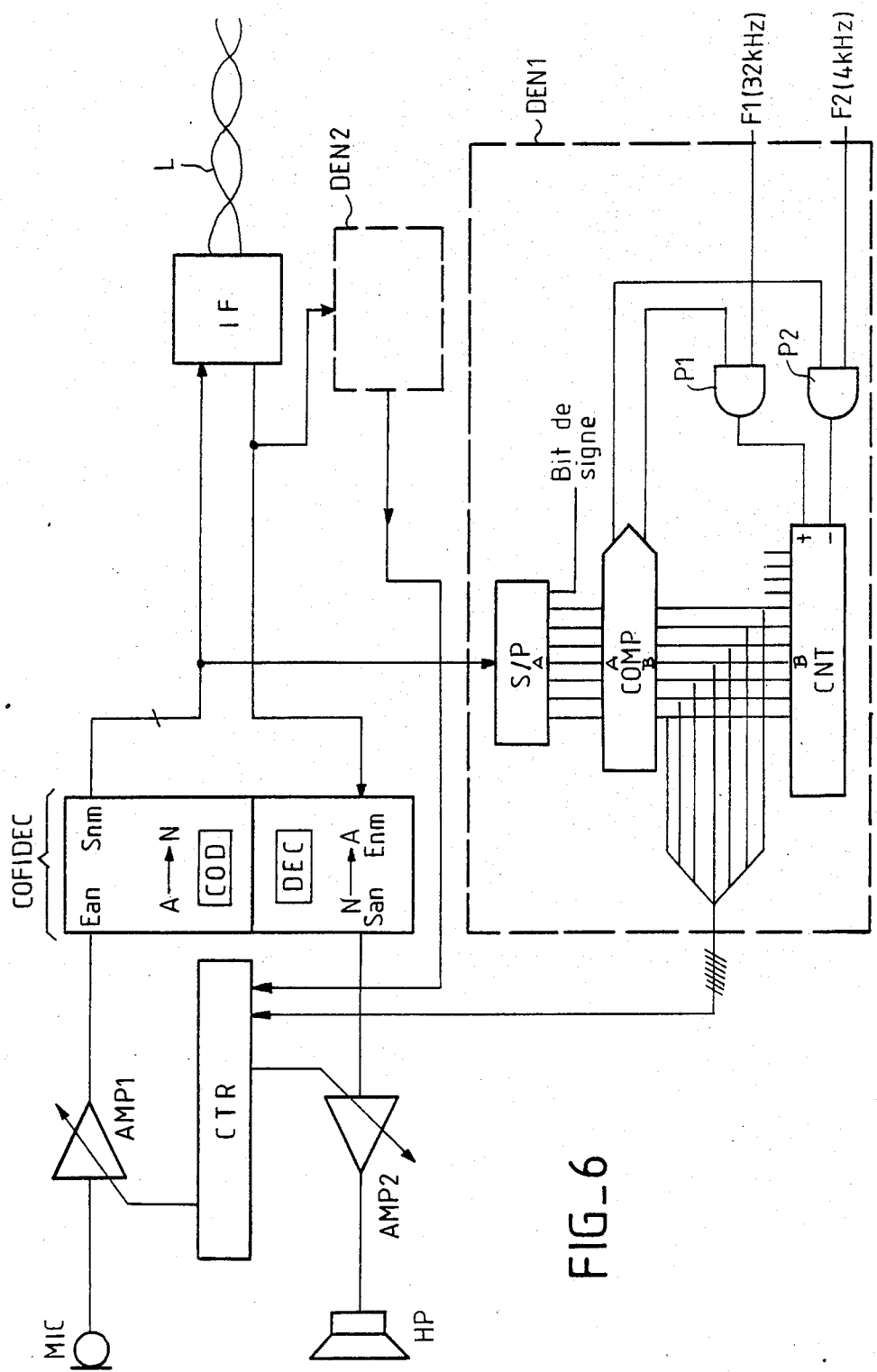
FIG_6

INTEGRATED CIRCUIT FOR TELEPHONE SET WITH SIGNAL ENVELOPE DETECTOR

BACKGROUND OF THE INVENTION

1. Field of the Invention

The invention concerns digital telephone sets, namely telephone sets designed to transmit or receive speech signals, in the form of a digital signal, and not an analog one, on a telephone line.

2. Description of the Prior Art

These sets have an analog-digital and digital-analog conversion integrated circuit, now generally called a "cofidec circuit", interposed between the analog parts of the telephone set (mainly the loudspeaker and the microphone) and the digital parts (designed to be connected to the telephone line).

A cofidec circuit is more precisely a coder-decoder with filtering circuits to limit the band of frequencies transmitted on the line. The coder is a logarithmic (or substantially logarithmic) compression coder, that is, it converts analog signals into digital signals but does so in assigning them an attenuation coefficient that is all the smaller as the amplitude of the signals is great. The reason for this logarithmic compression is the need to improve the signal-to-noise ratio of the small signals. The decoder establishes a reverse digital-analog coding to re-establish the levels of amplitude of the originally emitted signal.

The invention more particularly concerns telephone sets with an amplified listening function (namely sets having a fairly high-powered external loudspeaker so that people in a room can hear the speech signals received). The invention also concerns, especially, telephone sets having a so-called "hands free" function, namely sets that can work without a handset. These sets have, on the body of the set itself and not on a movable handset, firstly an amplified loudspeaker for listening and, secondly, a microphone that is sensitive enough to collect the speech signals emitted by a person who is at a certain distance for example, at a distance of one meter or several meters) from the set.

Sets with amplified listening and, all the more so, "hands free" sets have a problem that is difficult to resolve: this is the problem of removing the "Larsen" effect, namely removing the risk that the circuits of the set will go into oscillation, with the a strident noise being produced in the loudspeaker.

In effect, whenever there is high-powered loudspeaker, there is a risk that the sound signal from the loudspeaker will be re-injected into the microphone, setting up a feedback loop with a gain that may be greater than one. This risk is clearly very high in "hands free" telephones where the microphone (or microphone amplifier) is more sensitive than that of a standard handset.

The general structure of the circuits of a digital telephone set with a "hands free" function is shown in FIG. 1.

The microphone is designated by the reference MIC, the loudspeaker by the reference HP and the telephone line by the reference L.

A cofidec circuit is represented, on the whole, in two parts which are a digital-analog coder COD and a decoder DEC with a conversion function that is complementary to the function of the coder.

An interface circuit IF is interposed between the digital input/output side of the cofidec and the telephone line L. Its function is to apply the signal that is present at a digital output Snm of the cofidec to the telephone line. This signal corresponds to a speech signal emitted by the microphone. It also has the function of receiving, from the line, a signal emitted from the other end of the line, and of applying it to a digital input Enm of the cofidec.

Finally, a circuit ML fulfilling the "hands free" function and, notably, the function of removing the Larsen effect, is interposed between the analog input/output side of the cofidec and the analog elements such as the microphone and the loudspeaker. This circuit is connected, firstly, to an analog input Ean of the cofidec to apply the analog signals coming from the microphone to it and, secondly, to an analog output San of the cofidec to receive analog signals coming from the line and transmit them to the loudspeaker.

The circuit fulfilling the "hands free" functions and, notably, the anti-Larsen function is represented in greater detail in FIG. 2.

It comprises, essentially:

A first variable gain amplifier AMP1, connected on its input side to the microphone MIC and connected on its output side to the analog input Ean of the cofidec;

A second variable gain amplifier AMP2 connected on its input side to the analog output San of the cofidec and connected on its output side to the loudspeaker;

And signal processing circuits designed to analyze the signals emitted by the microphone towards the telephone line and the signals received from the line going to the loudspeaker, to provide for the anti-Larsen effect.

Before giving a detailed explanation of the circuit of FIG. 2, we shall briefly indicate what this circuit should do.

There is a main need, in a telephone conversation, to determine the speaking side and the listening side; For the telephone set of the speaking side, the gain of the microphone has to be increased (i.e. there has to be an increase in the gain of the amplifier AMP1) and the gain of the loudspeaker has to be reduced (i.e. there has to be a reduction in the gain of the amplifier AMP2). For the set of the listening side it is necessary, on the contrary, to increase the gain of the loudspeaker (through action on AMP2) and to reduce the gain of the microphone (through action on AMP1). But, in both cases, the total loop gain of the following chain has to be kept below one: the microphone MIC, the amplifiers, the crosstalk (unwanted or deliberate) which makes a portion of the signal return towards the loudspeaker, and the acoustic coupling between the loudspeaker and the microphone.

Thus, the Larsen effect is prevented at the same time as the microphone and loudspeaker gains are adjusted at each instant, as a function of the conversation in progress.

Another parameter to be taken into consideration is the ambient noise picked up by the microphone. This ambient noise should not be taken for speech and should not put the gain controls into the reverse of the required state.

The role of the processing circuits of FIG. 2, therefore, is to assess whether the emitted signal and the received signal are a speech signal or a noise signal, to reduce the transmission gain of the weakest of the two signals and to increase the transmission gain of the strongest signal, unless the strongest signal is an ambient noise signal.

The gain transition should therefore be done lightly to prevent sound "clicks" that are audible on the line. The transition should take place quickly when one side starts speaking, and slowly when this side stops speaking. Other problems have to be taken into account (for example, a speaker who interrupts the other one), but these problems are unrelated to the present invention and shall, therefore, not be referred to herein.

The circuits of FIG. 2 therefore include different blocks designed to make the above-mentioned comparisons and assessments.

The basic block is a signal envelope detector that assesses the mean level of the (emitted or received) signal. It receives the signal for which it is desired to assess the level, and it gives a signal that represents the shape of the slow, mean variations of this signal, the fast variations being removed.

A first envelope detector DE1 has an input connected to the microphone to analyze the emitted signal, and a second envelope detector DE2 has an input connected to the analog output of the cofidec to analyze the received signal.

The outputs of the two detectors are applied to the inputs of a comparator COMP that determines the signal having the highest mean level.

Besides, these outputs can each be applied to the input of a detector, DB1 and DB2 respectively, the role of which is to determine whether the analyzed signal is rather a noise signal or rather a speech signal. Without going into the details, the noise detectors DB1 and DB2 detect the peaks of the envelope signal at output of the envelope detectors and compare them with the envelope signal. If the instantaneous envelope becomes greater than a certain quantity at the last peak detected, it is a speech signal. If not, it is related to ambient noise (the particular feature of which is that of being fairly stable).

The outputs of the comparator COMP and the noise detectors DB1 abd DB2 are applied to a control circuit CD which controls the gains of the amplifiers AMP1 and AMP2 as a function of the results of analysis of the signals that are emitted and received.

In the prior art, the envelope detector is made with a circuit such as the one shown in FIG. 3.

It is a logarithmic gain detector, i.e. it gives a signal representing the mean value of the received signal, but with a logarithmic scale. The small signals are more amplified (or less attenuated) than the big ones. This enables an accurate comparison to be made between the emitted and received signal levels, both for the big signals and for the small signals, without the signal-to-noise ratio's being excessively high for the small signals and without any risk of saturation for the big signals.

The prior art logarithmic envelope detector essentially comprises a logarithmic gain amplifier 10 receiving the analog signal, the level of which has to be controlled. This amplifier is followed by a full wave rectifier 12 when the input signal has positive and negative half cycles. The rectifier is followed by a smoothing RC integrator 14, the time constant of which is chosen to make the fast variations in signals disappear and to preserve the slow variations of the envelope.

The output of the detector is taken at the output of the RC integrator.

The logarithmic amplifier is an operational amplifier looped between its output and its input by two diodes in parallel, upside down with respect to each other. Since the diodes have a logarithmic current/voltage curve when they are in direct mode and since, at any instant, at least one of the diodes is in direct mode, the amplifier 10 has a logarithmic amplification coefficient, the amplification being far greater for the small signals than for the big ones.

FIG. 4 shows, as an example, a waveform of an analog signal received at the input of the envelope detector of FIG. 3 (line A). The line B represents the logarithmically compressed signal, at output of the amplifier 10. The range of variation of the signals has been reduced. The amplitude ratio between the small signals and the big ones is considerably smaller than on the line A. The line C represents the signal at output from the rectifier 12. Finally, the line D represents the output signal of the RC integrator 14. The fast variations of the input signal have disappeared. All that remain are the slow variations representing the envelope of the input analog signal or its mean level, but with a logarithmic scale.

In the telephone sets proposed up till now, the circuit of FIG. 1 is made by means of several different integrated circuits. The cofidec is generally made with an integrated circuit using MOS (CMOS or NMOS) technology which lends itself well to the making of conversion and filtering circuits. However, the circuit fulfilling the "hands free" functions is achieved by means of an integrated circuit using bipolar technology.

For, it is not possible to integrate two diodes in parallel and upside down with respect to each other into MOS technology.

Furthermore, whether it is MOS technology or bipolar technology, the circuit of FIG. 3 requires high value capacitances for the smoothing, and these capacitances cannot be integrated.

The present invention proposes a new circuit for telephone sets, enabling the envelope detector (and hence the entire "hands free" function) to be integrated into the same integrated circuit as the cofidecs, even if this integrated circuit is made by means of MOS technology. Another aim of the invention is the elimination of the external capacitances necessary for the signal envelope detection function.

SUMMARY OF THE INVENTION

According to the invention, there is proposed a circuit for a digital telephone set, including input/output terminals for analog signals and input/output terminals for digital signals, a logarithmic compression analog-digital coder-decoder interposed between the analog terminals and the digital terminals, at least one variable gain amplifier connected to the analog side of the coder-decoder, and a control circuit to control the gain of the variable gain amplifier, and at least one signal envelope detector designed to give the control circuit an indication on the mean signal level emitted on the telephone line or received on this line, a circuit wherein the envelope detector has an input connected to a digital output or input of the coder-decoder, and an output connected to the control circuit of the amplifier.

The envelope detector therefore receives not an analog signal coming from the microphone or from the analog output of the cofidec of FIG. 1. On the contrary, it receives a digital signal tapped on the digital side of the cofidec. Now, the standards of digital telephony stipulate that cofidecs should have a function of logarithmic or almost logarithmic compression in the analog-digital direction (and a reverse expansion function in the opposite direction).

It is therefore possible to dispense with the logarithmic gain amplifier of FIG. 3.

Moreover, it is also possible to do without the rectifier because the standards of the cofidecs for telephone sets stipulate a digital coding with one sign bit and 7 bits (for example) defining the amplitude in absolute value. Not using the sign bit is enough to achieve the full-wave rectifier function.

Finally, by using a digital counter and digital comparator, it will be shown how it is possible to achieve the integration function or low-pass filtering function of the integrator 14 of FIG. 3, without using capacitances.

The envelope detector preferably has a digital counter having a counting input and a countdown input, a digital comparator connected, firstly, to the digital input or the digital output of the coder-decoder and, secondly, to the outputs of the counter, and a control logic circuit connected to the output of the comparator and capable of controlling the incrementation of the counter at a first frequency or the decrementation of the counter at a second frequency which is different from the first one, depending on the state of the counter, the output of the detector being connected to the outputs of the counter.

In principle, the counting frequency will be higher than the countdown frequency. For example, it is eight times higher.

The counting frequency depends on the speed at which it is desired that the counter should follow the variations of the input signal.

The countdown frequency will be all the lower as it is desired to have slower variations of the envelope signal. It acts like the cut-off frequency of the RC integrator of FIG. 1.

The emitted signal envelope detector as well as the received signal envelope detector may be made in this way. One will have its input connected to the digital output of the cofidec while the other will have its input connected to the digital input of the cofidec.

It has to be noted that the output signal of the envelope detector according to the invention is, in this case, a digital signal and not an analog signal. This is of no importance because the ultimate aim is to compare the level of the envelope signal with a determined value or with another signal, and these comparisons can be done on digital signals as well as on analog signals.

BRIEF DESCRIPTION OF THE DRAWINGS

Other characteristics and advantages of the invention will appear from the reading of the following detailed description, made with reference to the appended drawings, of which:

FIG. 1, already described, represents the structure of a circuit for a prior art telephone set;

FIG. 2 shows the detail of the circuit fulfilling the "hands free" function in the prior art;

FIG. 3 represents a prior art signal envelope detector;

FIG. 4 illustrates the waveforms at various points of the circuit of FIG. 3;

FIG. 5 represents the standard conversion curve of a cofidec, showing the logarithmic compression of the analog input towards the digital output;

FIG. 6 shows the circuit according to the invention.

DESCRIPTION OF PREFERRED EMBODIMENTS

The binary coding of the amplitude of the analog signal is shown for a standard cofidec in FIG. 5. The coding is an eight-bit coding with one sign bit and seven bits defining the amplitude of the signal in terms of absolute value.

The x-axis shows the amplitude of the signal according to a linear scale (which is arbitrary: a minimum amplitude of 0 and a maximum amplitude of 1 are considered). The y-axis also uses a linear scale to give a decimal digital representation of the binary output. In other words, while the seven output bits can take all the binary values between 0000000 and 1111111, these values have been represented by corresponding decimal numbers from 0 to 127.

As can be seen, a curve with a generally logarithmic shape (which, however, varies in the form of a staircase) represents the digital value of the output binary code as a function of the amplitude of the input analog signal.

The logarithmic curve can be broken down into eight straight-line segments. The segments are coded by the three most significant bits of the binary output. Consequently, the first segment corresponds to the digital values 0 to 15, the second segment corresponds to the digital values 16 to 31, the third to the values 32 to 47, etc, up to the eighth segment which corresponds to the values 111 to 127.

The coding of the three bits defining the segment corresponding to a range of given amplitudes is substantially logarithmic, inasmuch as, to keep to the substantially logarithmic shape of the curve plotted in FIG. 5, the successive segments have slopes varying in logarithmic progression. It is clearly seen in FIG. 5 that, for the very small signals (smaller than 1% of the maximum), the slope is very steep while, for the big signals, it is very slight. In practice, the first straight-line segment is used to code only the signals with amplitude between 0% and 1% of the maximum while the last segment is used by itself to code the signals with amplitude between 50% and 100% of the maximum.

Within each straight-line segment, the four least significant bits are used to define the precise value of the analog signal. This time, the coding is linear and not logarithmic, i.e., if the analog signal is incremented by a given step value (16 identical steps to go through the entire segment), then the digital value is incremented by one unit (one less significant bit).

Since the cofidec gives a logarithmically compressed signal, and since the seven output bits define, in terms of absolute value, the logarithmically compressed amplitude of the signal emitted or received on the telephone line, it suffices to use this coding and to look at the mean overall variations of the digital signal in eliminating the fast variations to achieve the desired envelope detection function.

The following is the method used in the embodiment described with reference to FIG. 6: the digital signal will be compared with the content of a counter. If the signal is greater than the content of the counter, the counter is incremented with a relatively high frequency F1. If, on the contrary, the digital signal becomes smaller than the content of the counter, the counter is decremented, but with a lower frequency F2. The content of the counter then represents a digital approximation of the envelope of the input signal.

FIG. 6 shows the entire circuit according to the invention. Elements playing the same role as in FIG. 1 bear the same references: the cofidec COD and its decoder DEC, and with its analog input Ean and digital input Enm, and its analog output San and digital output Snm, the microphone MIC and its variable gain amplifier AMP1, the loudspeaker HP and its variable gain amplifier AMP2, the telephone line L, the interface circuit IF.

The variable gain amplifiers are controlled by a control circuit CTR as a function of the mean level comparisons of the signals emitted and received on the line, and as a function of whether the strongest signal is the noise signal or the speech signal.

The signal envelope detectors, which are used to determine the mean signal levels, are designated by DEN1 for the emitted signal and DEN2 for the received signal.

Noise detectors may be used as in FIG. 1. They are not shown, so as not to clutter up FIG. 6. If used, they are preferably built in digital form, chiefly by means of registers and comparators.

As can be seen, the envelope detectors DEN1 and DEN2 have their input connected on the digital side of the cofidec. DEN1 has its input connected to the digital output Snm, and DEN2 has its input connected to the digital input Enm.

The outputs of the detectors DEN1 and DEN2 are applied to the control circuit CTR. These outputs are digital outputs.

The detector DEN2 is strictly identical to the detector DEN1. Only DEN1 has been shown in detail.

The envelope detector DEN1 has an input element which is a series/parallel converter S/P in the general case where the digital output and input signals of the cofidec are series binary words.

The detector also has a seven-bit digital comparator COMP and a digital counter CNT.

The parallel outputs of the converter S/P are connected by one side of the comparator COMP. The seven most significant bit outputs of the counter CNT are connected by the other side of the comparator COMP.

The counter CNT is, for example, an 11-bit counter. It has a counting input (+) and a countdown input (−).

The comparator COMP has two outputs (or one output and one logic circuit to set up two complementary outputs). One of the outputs gives a signal authorizing incrementation of the counter when the logarithmically digitalized amplitude A of the signal emitted on the line is greater than content B of the counter CNT (defined from its seven most significant bits). The other output gives a signal authorizing the decrementation of the counter when the amplitude A of the digital signal is smaller than the content B of the counter.

An incrementation clock signal at frequency F1 is applied to the incrementation input of the counter through a validation gate PI controlled by the incrementation signal at output of the comparator. Conversely, a decrementation clock signal at frequency F2 is applied to the decrementation input through a validation gate P2 controlled by the decrementation signal at output of the comparator.

The incrementation frequency F1 is far higher than the decrementation frequency F2.

In an example where the cofidec gives an eight-bit word every 125 milliseconds (8 kilohertz conversion frequency), we can take an incrementation frequency of 32 kilohertz and a decrementation frequency of 4 kilohertz.

The output of the envelope detector is a digital output taken on the seven most significant bits of the counter CNT.

The circuit works in the following way: if the signal grows in such a way that its value A exceeds the level indicated by the seven most significant bits of the counter, then the counter gets incremented rapidly, and the counter tends to follow the level of the signal, with a response time which, however, is limited by the counting frequency. When the signal is again below the content of the counter, either because the content of the counter finally catches up with the signal or because the signal has again fallen, the counter is decremented, but very slowly so that the counter retains the maximum level, previously reached by the analog signal, in memory with a major time constant. It is in this sense that the output of the detector represents (in digital form) the envelope of the slow variations of the signal emitted (for DEN1) or received (for DEN2).

The digital outputs of DEN1 and DEN2 are applied to the control circuit CTR which makes the necessary comparisons and controls the amplifiers on the analog side of the cofidec to fulfil the anti-Larsen functions, or any other function for which the signal envelope detector proves to be useful.

What is claimed is:

1. A circuit for a digital telephone set, including input/output terminals for analog signals and input/output terminals for digital signals, a logarithmic compression analog-digital coder-decoder interposed between the analog terminals and the digital terminals, at least one variable gain amplifier connected to the analog side of the coder-decoder, and a control circuit to control the gain of the variable gain amplifier, and at least one signal envelope detector designed to give the control circuit an indication on the mean signal level either emitted on the telephone line or received from the line, a circuit wherein the envelope detector has an input connected to a digital output or input of the coder-decoder, and an output connected to the control circuit of the amplifier.

2. A circuit according to claim 1, characterized in that the envelope detector includes a digital counter having a counter input and a countdown input, a digital comparator connected, firstly, to a digital input or output of the coder-decoder and, secondly, to the outputs of the counter, and a control logic circuit connected to the output of the comparator and capable of controlling the incrementation of the counter at a first frequency, or the decrementation of the counter at a second frequency which is different from the first frequency, depending on the state of the counter, the output of the detector being taken at the outputs of the counter.

3. A circuit according to claim 2, wherein the first frequency is far higher than the second frequency.

4. A circuit according to one of the claims 2 or 3, wherein the coder-decoder gives and receives binary words having, firstly, a sign bit and, secondly, bits defining the amplitude in terms of absolute value of the emitted or received signal, only the latter bits being applied to the comparator.

5. A circuit according to one of the claims 2 or 3, wherein the counter has most significant outputs and least significant outputs, only the most significant outputs being applied to the comparator.

6. A circuit according to one of the claims 2 or 3, wherein the envelope detector has a series/parallel converter interposed between the digital input or output of the coder-decoder and the comparator.

7. A circuit according to claim 1, comprising an envelope detector for the signal emitted on the line and an envelope detector for the received signal, the former being connected to a digital output of the coder-decoder and the latter being connected to a digital input of the coder-decoder.

8. A circuit according to claim 4, wherein the envelope detector has a series/parallel converter interposed between the digital input or output of the coder-decoder and the comparator.

* * * * *